(12) United States Patent
Puttichaem et al.

(10) Patent No.: US 8,587,901 B1
(45) Date of Patent: Nov. 19, 2013

(54) MAGNETIC RECORDING HEAD SLIDER COMPRISING BOND PAD HAVING A PROBE CONTACT AREA AND A SOLDER CONTACT AREA

(75) Inventors: Wachira Puttichaem, Lamphun (TH); Adisak Tokaew, Mahasarakham (TH); Tzong-Shii Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 435 days.

(21) Appl. No.: 12/650,459

(22) Filed: Dec. 30, 2009

(51) Int. Cl.
*G11B 5/60* (2006.01)
(52) U.S. Cl.
USPC ........................................ 360/234.5
(58) Field of Classification Search
USPC ........................................ 360/234.5; 174/261
See application file for complete search history.

(56) References Cited

U.S. PATENT DOCUMENTS

| | | | |
|---|---|---|---|
| 5,414,223 A | 5/1995 | Suski et al. | |
| 5,465,186 A | 11/1995 | Bajorek et al. | |
| 5,692,669 A | 12/1997 | Sakemi et al. | |
| 5,699,212 A * | 12/1997 | Erpelding et al. | 360/245.8 |
| 5,796,549 A * | 8/1998 | Sedbrook et al. | 360/234.5 |
| 6,091,155 A | 7/2000 | Jonaidi | |
| 6,133,134 A | 10/2000 | Mehr | |
| 6,292,372 B1 | 9/2001 | Lin et al. | |
| 6,330,132 B1 * | 12/2001 | Honda | 360/234.5 |
| 6,674,610 B1 | 1/2004 | Thomas et al. | |
| 6,977,443 B2 | 12/2005 | Ano | |
| 6,998,715 B1 | 2/2006 | Fuji et al. | |
| 7,110,222 B2 | 9/2006 | Erpelding | |
| 7,239,485 B2 * | 7/2007 | Boutaghou et al. | 360/245.9 |
| 7,554,769 B2 | 6/2009 | Yamakura et al. | |
| 7,619,856 B2 * | 11/2009 | Matsumoto et al. | 360/234.5 |
| 7,739,785 B2 * | 6/2010 | Watanabe et al. | 29/603.06 |
| 7,881,017 B2 * | 2/2011 | Bhatia et al. | 360/294.7 |
| 7,952,833 B2 * | 5/2011 | Smith | 360/234.5 |
| 8,174,793 B2 * | 5/2012 | Hasegawa et al. | 360/234.5 |
| 8,259,415 B2 * | 9/2012 | Hutchinson et al. | 360/234.5 |
| 2002/0084105 A1 | 7/2002 | Geng et al. | |
| 2004/0181932 A1 * | 9/2004 | Yao et al. | 29/603.03 |
| 2009/0086374 A1 | 4/2009 | Smith | |

* cited by examiner

*Primary Examiner* — Brian Miller

(57) ABSTRACT

Examples of a magnetic recording head slider, a head gimbal assembly and methods of manufacturing each are disclosed. The magnetic recording head slider may comprise a slider body and a plurality of bond pads formed on a trailing edge of the slider body. Each of the plurality of bond pads may include a probe contact area and a soldering contact area. The probe contact area may be larger than the soldering contact area. The head gimbal assembly may include a suspension arm with conductive leads. A plurality of bond pads may be formed on the suspension arm in contact with the ends of the conductive leads. A width of a proximal portion of each of the bond pads may be greater than a width of a distal portion of each of the plurality of bond pads. The methods may include forming the above-described structures.

8 Claims, 6 Drawing Sheets

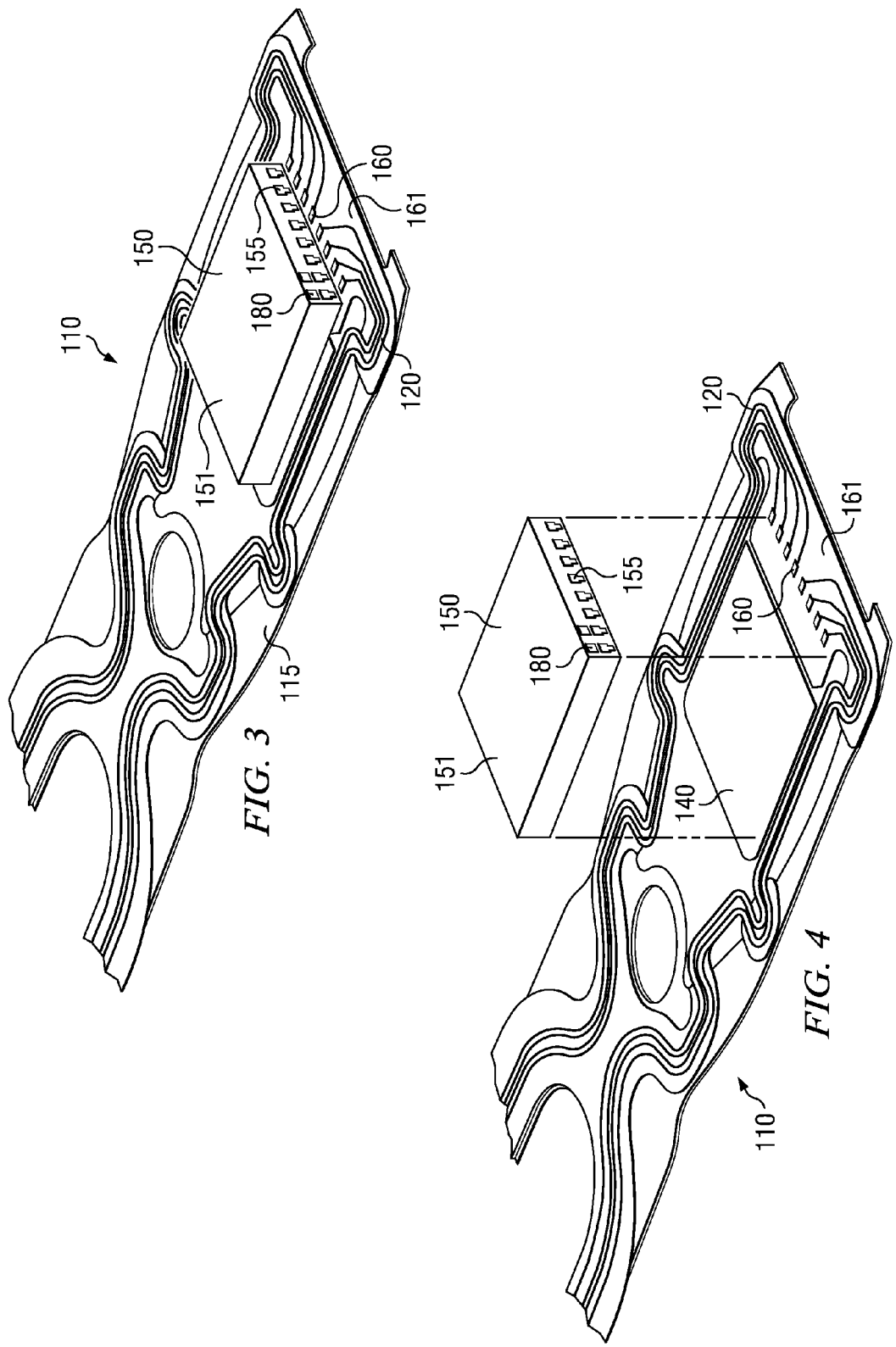

MAGNETIC RECORDING HEAD SLIDER COMPRISING BOND PAD HAVING A PROBE CONTACT AREA AND A SOLDER CONTACT AREA

BACKGROUND

The subject disclosure relates to disk drive components, and more particularly, to bond pad configurations for magnetic recording head sliders.

The assembly and testing of hard disk drive components may include components positioned adjacent to one another in a relatively tight spacing. The addition of components to assemblies may further encroach upon the spacing between one component and another. Maintaining spacing between components may be significant where adjacent components may inadvertently form an electrical connection.

For example, a hard disk drive magnetic recording head slider may include multiple bond pads that are eventually bonded to another set of pads on a suspension arm assembly. In a typical magnetic recording head slider, bond pads may be formed in a uniform rectangular shape. The bond pads may be arranged side by side spaced to one another and solder bonded to respective bond pads on the suspension arm assembly. Maintaining a minimum pad gap between adjacent pads may be significant in preventing solder during reflow from flowing off of one pad and bridging the gap between neighboring pads.

However, as bond pads may become smaller to accommodate additional bond pads in an area, the ability to test the bond pads for reliability may be affected. For example, a probe contacting a bond pad during testing may include a tip with a dimension larger than a bond pad dimension. Thus, the size of a conventional bond pad may be limited with respect to the size of the smallest available probe. Furthermore, the probe tip may scratch some of the metal off of the bond pad, thus hampering the effective bonding area of the solder to adhere to the bond pad.

Accordingly, there is a need for a head slider and a method of manufacturing thereof that can provide for enough probing contact area on a bond pad while maintaining an adequate gap between adjacent bond pads.

SUMMARY

In one aspect of the disclosure, a magnetic recording head slider comprises a slider body. A plurality of bond pads may be formed on a trailing edge of the slider body. Each of the plurality of bond pads may include a probe contact area and a soldering contact area. In addition, the probe contact area may be larger than the soldering contact area.

In another aspect of the disclosure, a head gimbal assembly comprises a suspension arm. A plurality of conductive leads may be formed on the suspension arm. A plurality of bond pads may be formed on the suspension arm in contact with the ends of the plurality of conductive leads. A width of a proximal portion of each of the plurality of bond pads may be greater than a width of a distal portion of each of the plurality of bond pads.

In another aspect of the disclosure, a method for manufacturing a magnetic recording head slider includes providing a slider body. The method also includes forming a plurality of bond pads in a linear arrangement adjacent one another on a trailing edge of the slider body. Each of the plurality of bond pads comprises a probe contact area distal to a mounting surface of the slider body and a soldering contact area proximal to the mounting surface of the slider body. The probe contact area may be larger than the soldering contact area.

In another aspect of the disclosure, a method for manufacturing a head gimbal assembly includes providing a suspension arm. A plurality of conductive leads may be formed on the suspension arm. A plurality of bond pads may be formed in a linear arrangement adjacent one another on the suspension arm in contact with respective ends of the plurality of conductive leads. A width of a proximal portion of each of the plurality of bond pads is greater than a width of a distal portion of each of the plurality of bond pads.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 3 is an enlarged perspective end view illustrating a slider head mounted to the actuator arm of FIG. 2 according to certain aspects of the present disclosure.

FIG. 4 is a perspective end view of the slider head exploded from the actuator arm of FIG. 3.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figure 1:
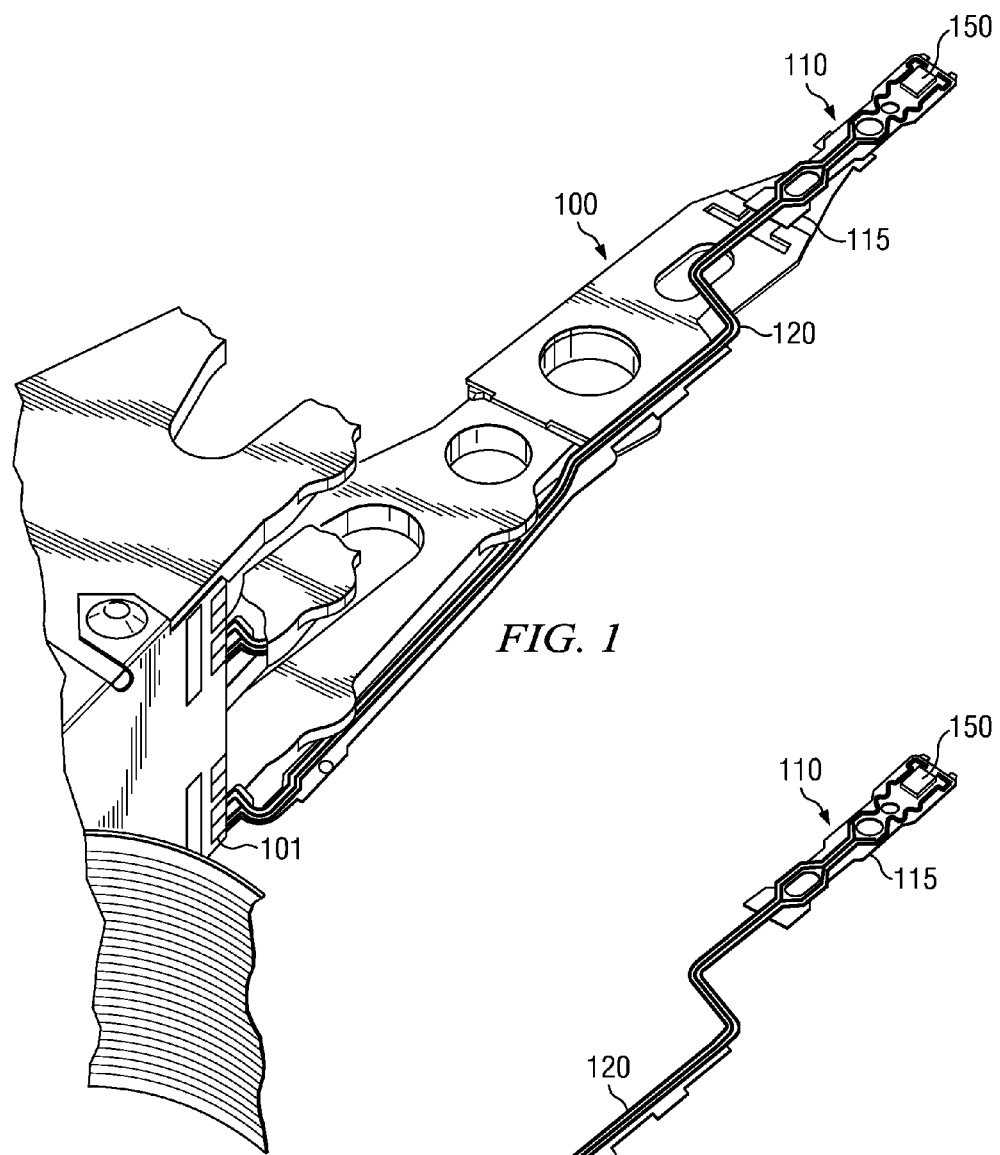
FIG. 1 is a perspective top view illustrating an example of an actuator arm.

FIG. 1 shows a perspective view of a portion of an actuator arm 100. The actuator arm 100 includes a head gimbal assembly 110, a suspension arm 115, a magnetic recording head slider 150, and a bundle of leads 120 coupling the magnetic recording head slider 150 to a flex circuit assembly 101.

Figure 2:
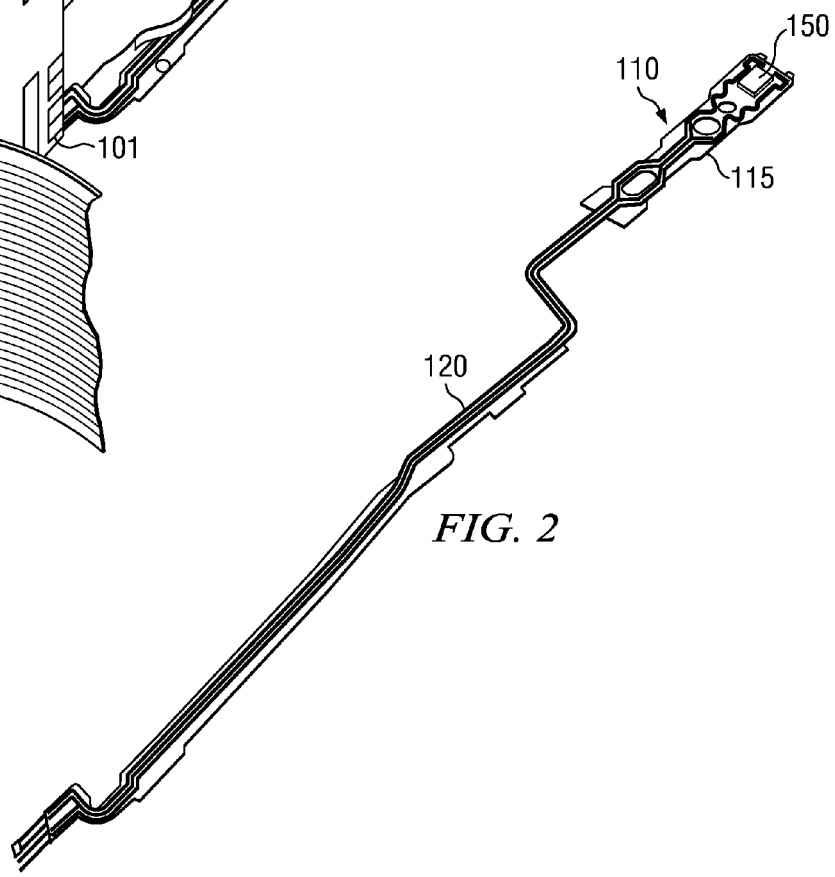
FIG. 2 is a perspective top view illustrating an example of a head gimbal assembly isolated from the actuator arm of FIG. 1.

FIG. 2 is a perspective view of the head gimbal assembly 110 isolated from the actuator arm 100 of FIG. 1 as shown with the magnetic recording head slider 150.

FIGS. 3 and 4 are enlarged perspective views of a portion of the head gimbal assembly 110 and the magnetic recording head slider 150 mounted onto and exploded from the head gimbal assembly 110. The magnetic recording head slider 150 includes a plurality of slider bond pads 155 formed on a slider body 151. The suspension arm 115 includes a plurality of arm bond pads 160 formed on an arm trace pad 161. In one aspect, the number of slider bond pads 155 may be the same as the number of arm bond pads 160. The slider bond pads 155 may be bonded to respective arm bond pads 160. Arm bond pads 160 may be coupled to respective leads 120. Two additional contact pads 180 may be formed above the bond pads 155 disposed proximally to an air bearing surface 145. For sake of illustration, the bond pads 180 are not shown coupled to any leads, however, it will be understood that the bond pads 180 may also be coupled to the flex circuit assembly 101.

Figure 5:
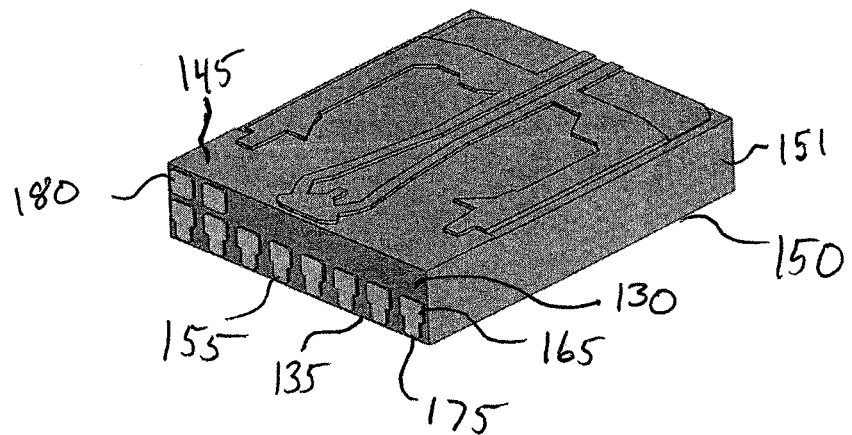
FIG. 5 is a perspective side view illustrating an example of a slider head according to certain aspects of the present disclosure.

FIG. 5 is an enlarged view of the magnetic recording head slider 150. In one aspect, the magnetic recording head slider 150 includes a plurality of slider bond pads 155 formed on a trailing edge 130 of the slider body 151. In one example of a magnetic recording head slider 150, eight slider bond pads 155 may be formed in a linear arrangement adjacent to one another.

In one aspect, the slider bond pads 155 may include two sections: a probe contact area 165 and a soldering contact area 175. The soldering contact area 175 may be disposed proximally to a mounting surface 135 of the slider body 151. The mounting surface 135 may be opposite the air bearing surface 145 on the slider body 151. The probe contact area 165 may be disposed distally to the mounting surface 135 of the slider body 150.

Figure 6A:
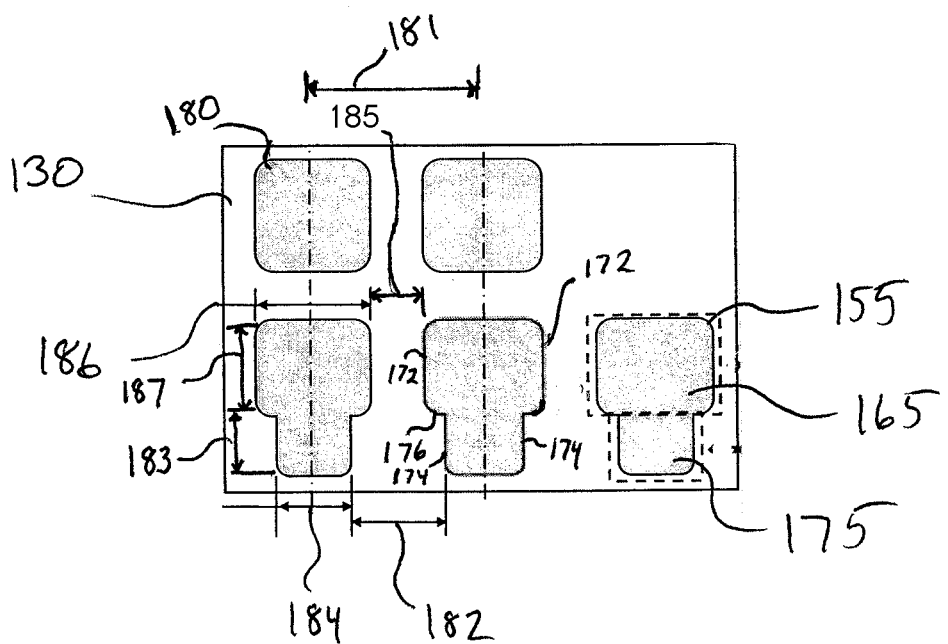
FIG. 6A is an enlarged partial end view illustrating bond pads on the slider head trailing edge of FIG. 5 according to certain aspects of the present disclosure.

Referring to FIG. 6A, in one aspect, the probe contact area 165 is larger then the soldering contact area 175. A width 186 of the probe contact area 165 may be greater than a width 184 of the soldering contact area 175. For example, the width 186 of the probe contact area 165 may be approximately 60 micrometers. The height 187 of the probe contact area 165 may be approximately 60 micrometers. The width 184 of the soldering contact area may be approximately 40 micrometers. The height 183 of the soldering contact area 175 may be approximately 40 micrometers. While the probe contact area 165 and the soldering contact area 175 have been described according to particular dimensions in width and height, it will be understood that these dimensions are for sake of illustration and the probe contact area 165 and the soldering contact area 175 are not limited to these particular dimensions.

In one aspect, the bond pads 155 may be configured in a substantially T-shaped configuration. The larger probe contact area 165 may be positioned abutting the smaller soldering contact area 175. In one aspect, the side edges 172 may extend beyond the side edges 174 providing an overhang edge 176 between the probe contact area 165 and the soldering contact area 175.

The slider bond pads 155 may be formed in a linear arrangement at a constant pitch 181 along the trailing edge 130 of the slider body 150. For example, the pitch 181 may be approximately 87 micrometers between slider bond pads 155. In one aspect, the slider bond pads 155 may be formed with like areas equally spaced from each other. For example, there may be equal spacing between the side edge 172 of one slider bond pad 155 and the side edge 172 of an adjacent slider bond pad 155. There may also be equal spacing between the side edge 174 of one slider bond pad 155 and the side edge 174 of an adjacent slider bond pad 155. In one aspect, the spacing 182 between adjacent soldering contact areas 175 may be greater than a spacing 188 between adjacent probe contact areas 165. For example, the spacing 182 may be approximately 47 micrometers and the spacing 185 may be approximately 27 micrometers. While the arrangement of the slider bond pads 155 have been described according to particular dimensions in pitch and spacing, it will be understood that these dimensions are for sake of illustration and that the arrangement of the slider bond pads 155 are not limited to these particular dimensions.

In one aspect, the formation of the bond pads 155 may accommodate probing of the probe contact area 165 while providing that the soldering contact area 175 remain undisturbed. For example, a typical probe that may be used to test the bond pads 155 may include a tip approximately 50 micrometers large. The probe tip may be used to contact the probe contact area 165 while remaining clear of the soldering contact area 175.

Figure 6B:
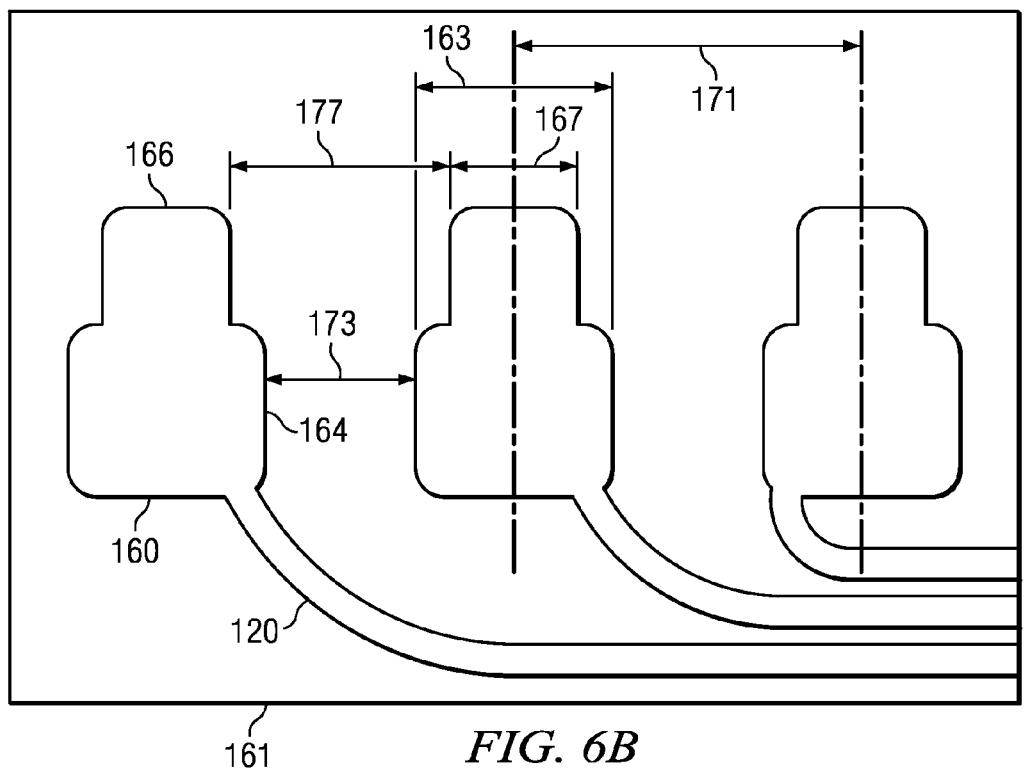
FIG. 6B is an enlarged partial end view illustrating bond pads on a suspension arm according to certain aspects of the present disclosure.

Referring to FIG. 6B, a partial enlarged view of the trace arm pad 161 and gimbal 140 is shown. In one aspect, the arm bond pads 160 may be formed into portions of differing width. Each of the arm bond pads 160 may include a portion 164 proximal to a conductive lead 120 coupled to respective arm bond pads 160. Each of the arm bond pads 160 may include a portion distal to respective leads 120. In one aspect, the arm bond pads 160 may be formed to taper down from the proximal portion 164 to the distal portion 166. The width 163 of the proximal portion 164 may be larger than the width 163 of the distal portion 166. The arm bond pads 160 may be formed adjacent to one another in a linear arrangement on the trace arm pad 161. Adjacent arm bond pads 160 may be formed at a constant pitch 171 from one another. A spacing 173 between proximal portions 164 may be smaller than a spacing 177 between distal portions 166.

Figure 7:
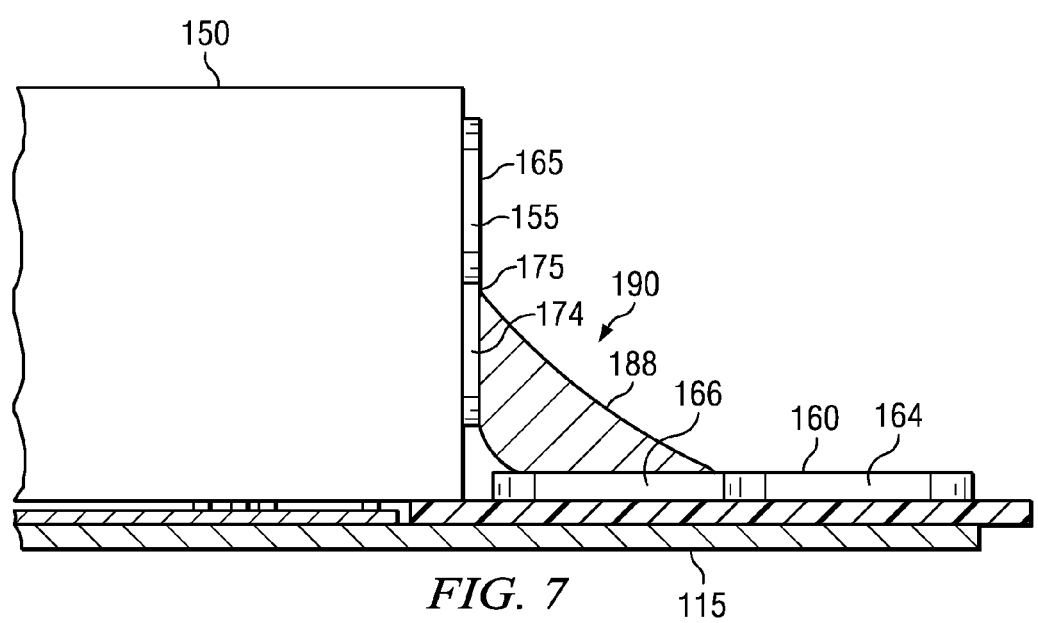
FIG. 7 is a side view illustrating an example of a solder joint between a bond pad on a slider head and a bond pad on a trace suspension arm assembly.
Figure 8:
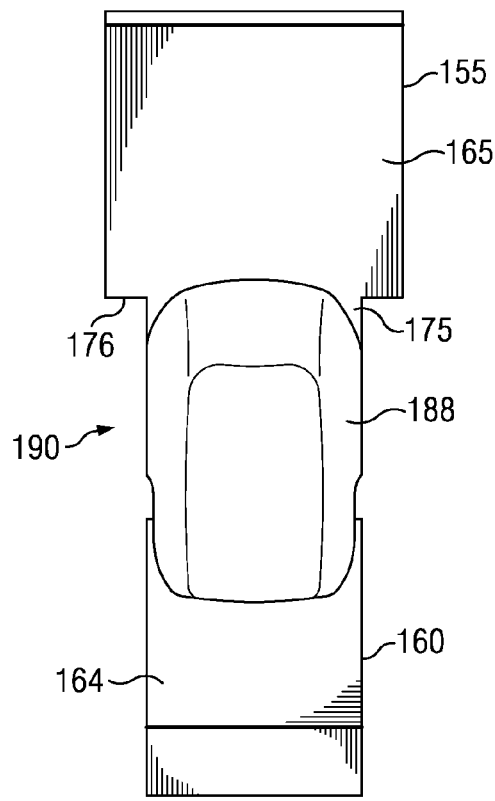
FIG. 8 is an enlarged front perspective view illustrating an isolated solder joint of FIG. 7.
Figure 9:
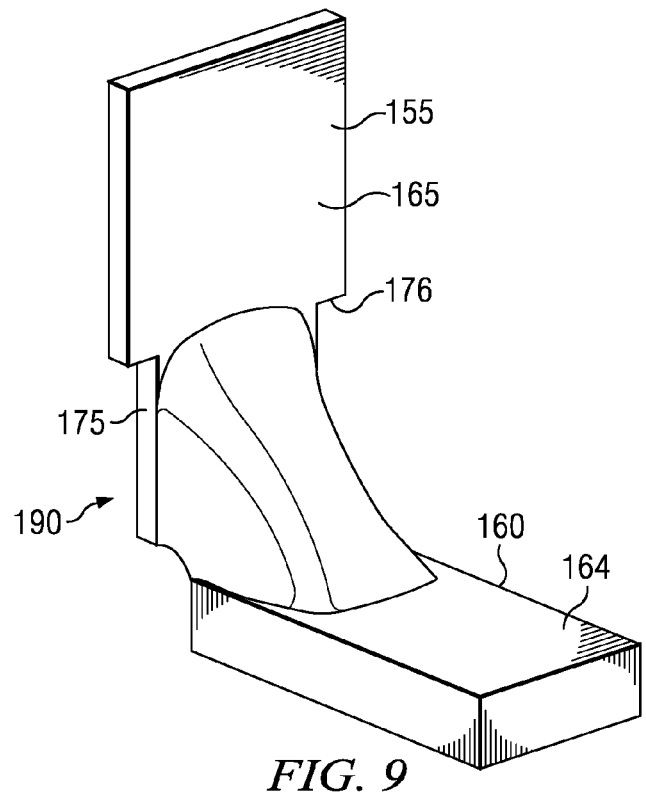
FIG. 9 is an enlarged side perspective view illustrating an isolated solder joint of FIG. 7.

Referring to FIGS. 7 to 9, a solder joint 190 including a solder 188 bonding the slider bond pad 155 to the arm bond pad 160 is illustrated in accordance with an aspect of the subject technology. A solder 188 may be applied to the soldering contact area 175 of the bond pad 155 and to the arm bond pad 160. The solder joint 190 provides a secure coupling of the magnetic recording head slider 150 to the suspension arm 115. The solder 188 applied to the soldering contact area 175 will adhere to and substantially cover the soldering contact area 175 and will simultaneously adhere to the underlying arm bond pad 160. In one aspect, the solder 188 may be applied as a ball-shaped piece of solder. During bonding, the solder 188 may flow up the soldering contact area 175 through capillary action adhering along the side edges 174. The solder 188 may encounter the overhang edge 176 which may act as a barrier to further flow of the solder 188 upwards into the probe contact area 165 as the solder 188 becomes thinner during spreading. The amount of solder 188 employed may be controlled so that the solder 188 may spread to the side edges 174 and adhere thereto without flowing off of the slider bond pad 155. The thinner soldering contact area 175 may provide greater spacing between adjacent soldering contact areas thus preserving an electrical gap between the soldering contact area 175 of adjacent slider bond pads 155.

In one aspect, referring back to FIG. 6B with concurrent reference to FIGS. 7-9, the tapered form of the arm bond pads 160 may accommodate more solder while providing a safe distance between adjacent arm bond pads 160 when the magnetic recording head slider 150 is bonded to the suspension arm 115. For sake of illustration, the solder 188 is illustrated as partially covering the arm bond pad 160 so as not to obscure the entire arm bond pad. However, in one aspect, the solder 188 may spread over the entire arm bond pad 160. In FIGS. 8-9, the distal portion 166 is obstructed by the solder 188, however, it will be understood that the distal portion 166 may be present in accordance with one aspect of the present disclosure. The distal portion 166, with its narrower width 167, may provide wider spacing between adjacent distal portions 166 when the arm bond pads 160 are soldered to the slider bond pads 155. The narrower width 167 of distal portions 166 may provide an increase in the spacing 177 between adjacent distal portions 166. In one aspect, an increase in the spacing 177 may reduce the occurrences of solder bridging between adjacent distal portions 166. The proximal portion 164, with its larger width 163, may accommodate an increased amount of solder 188 applied to the proximal portion 164. In one aspect, the larger width 163 may provide an increase in the surface area of the proximal portion 164 which may provide for more solder 188 to be used over the proximal portion 164. In one aspect, an increase in solder 188 applied to the proximal portion 164 may increase the strength of the solder joint 190. Additionally, the increased amount of solder 188 applied to the proximal portion 164 may compensate for the lesser amount of solder 188 applied to the distal portion 166.

Figure 10:
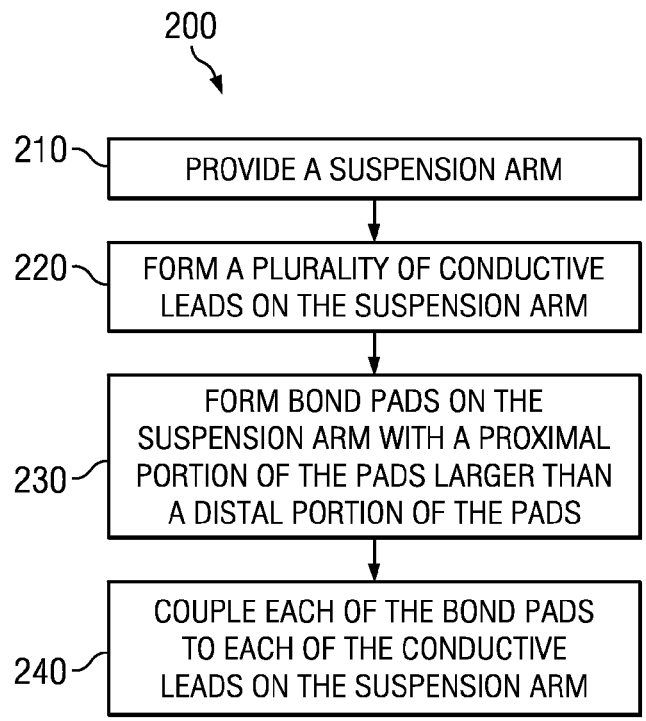
FIG. 10 is a flow chart illustrating an example of a method of manufacturing a head gimbal assembly according to certain aspects of the present disclosure.

Referring to FIG. 10, an exemplary method 200 for manufacturing a head gimbal assembly is shown.

In operation 210, a suspension arm may be provided. The suspension arm may be the suspension arm 115 shown in FIG. 1.

In operation 220, a plurality of conductive leads may be formed on the suspension arm.

In operation 230, bond pads may be formed on the suspension arm. The bond pads may be formed with a width of a proximal portion larger than a width of a distal portion. The distal and proximal portions may be formed in accordance with the description of the arm bond pad 160 shown in FIG. 6B above. The bond pads may be made from conductive material. Conductive material used may include gold, copper or metal alloys. The bond pads may be formed according to photolithographic techniques. The photolithographic techniques may include preparing a mask over a substrate of the conductive material outlining the configuration of the bond pads with a width of a proximal portion larger than a width of a distal portion. An etching process may be used to form the bond pads according to the configuration outlined by the mask.

In operation 240, bond pads from a magnetic recording slider head may be soldered to the bond pads on the suspension arm.

Figure 11:
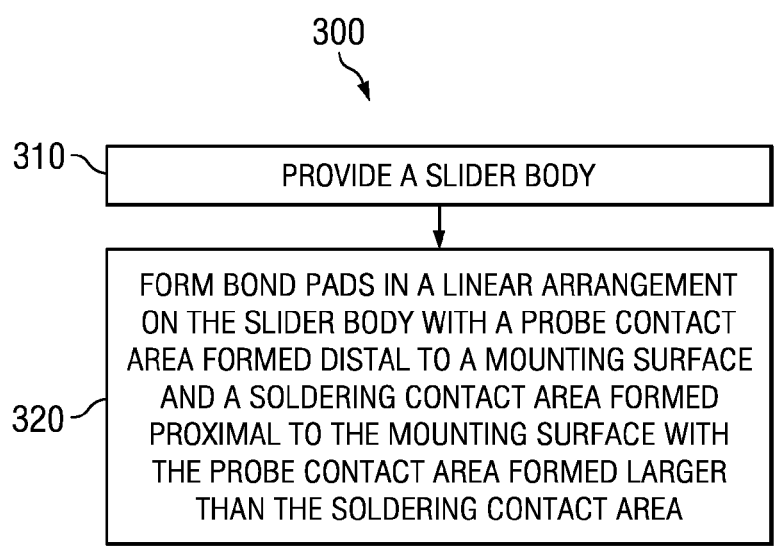
FIG. 11 is a flow chart illustrating an example of a method of manufacturing a magnetic recording head slider according to certain aspects of the present disclosure.

Referring to FIG. 11, an exemplary method 300 method for manufacturing a magnetic recording head slider is shown.

In operation 310, a slider body may be provided. The slider body may be the slider body 151 shown in FIG. 5.

In operation 320, a plurality of bond pads may be formed in a linear arrangement adjacent one another on a trailing edge of the slider body. Each of the plurality of bond pads may include a probe contact area distal to a mounting surface of the slider body and a soldering contact area proximal to the mounting surface of the slider body. The probe contact area may be larger than the soldering contact area. The bond pads may be made from conductive material. Conductive material used may include gold, copper or metal alloys. The bond pads on the slider body may be formed according to the photolithographic techniques described in operation 230 except that the mask may outline a configuration of the bond pads with the probe contact area larger than the soldering contact area.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A magnetic recording head slider, comprising:
   a slider body; and
   a plurality of bond pads formed on a trailing edge of the slider body,
   wherein each of the plurality of bond pads comprises a probe contact area and a soldering contact area with each area being laterally bounded in a width dimension, along the trailing edge, by respective edges of the pads wherein a width of the probe contact area is greater than a width of the soldering contact area of each respective pad whereby the probe contact area is larger than the soldering contact area.

2. The magnetic recording head slider according to claim 1, wherein the plurality of bond pads are formed in a linear arrangement adjacent one another along the trailing edge of the slider body.

3. The magnetic recording head slider according to claim 2, wherein each of the plurality of bond pads is aligned with the soldering contact area proximal to a mounting surface of the slider body and the probe contact area distal to the mounting surface of the slider body.

4. The magnetic recording head slider according to claim 1, wherein the plurality of bond pads comprises eight bond pads.

5. The magnetic recording head slider according to claim 1, wherein the plurality of bond pads are formed at a constant pitch along the trailing edge of the slider body, and wherein spacing between adjacent soldering contact areas is greater than spacing between adjacent probe contact areas.

6. The magnetic recording head slider according to claim 1, wherein the width of the soldering contact area is 40 µm or less and the width of the probe contact area is 60 µm or less.

7. A head gimbal assembly comprising:
   a suspension arm comprising a plurality of trace bond pads; and
   a slider coupled to the suspension arm, the slider comprising:
      a slider body; and
      a plurality of slider bond pads formed on a trailing edge of the slider body and soldered to the trace bond pads by a solder, wherein:
         each slider bond pad comprises a probe contact area and a soldering contact area with each area being laterally bounded in a width dimension, along the trailing edge, by respective edges of the pads wherein a width of the probe contact area is greater than a width of the soldering contact area of each respective pad whereby:
      the probe contact area is larger than the soldering contact area;
      the solder covers substantially all of the soldering contact area; and
      the probe contact area is substantially uncovered by the solder.

8. The head gimbal assembly as recited in claim 7, wherein:
   the soldering contact area comprises a first rectangular surface; and
   the probe contact area comprises a second rectangular surface wider than the first rectangular surface.

* * * * *